United States Patent [19]

Yamada et al.

[11] 4,019,131
[45] Apr. 19, 1977

[54] METHOD AND APPARATUS FOR MEASURING THE SHAPE OF THE WAVY EDGES OF METAL STRIPS USING A DETECTION COIL CONTROLLED TO TRACK THE STRIP EDGE

[75] Inventors: Takeo Yamada, Yokohama; Katsujiro Watanabe, Tokyo; Seigo Ando, Yokohama, all of Japan

[73] Assignee: Nippon Kokan Kabushiki Kaisha, Tokyo, Japan

[22] Filed: Oct. 30, 1975

[21] Appl. No.: 627,137

[30] Foreign Application Priority Data

Oct. 31, 1974 Japan ............................ 49-125816

[52] U.S. Cl. .......................... 324/34 R; 33/174 L; 318/653
[51] Int. Cl.² ........................................ G01R 33/12
[58] Field of Search ........... 324/34 R, 34 D, 34 PS, 324/37, 40; 33/143 L, 147 N, 174 L; 318/607, 653, 652

[56] References Cited

UNITED STATES PATENTS

| | | | |
|---|---|---|---|
| 3,346,807 | 10/1967 | Wood et al. | 324/37 |
| 3,502,968 | 3/1970 | Tobin, Jr. et al. | 324/40 |
| 3,585,495 | 6/1971 | Kubo | 324/34 R |
| 3,600,672 | 8/1971 | Kubo | 324/34 |
| 3,787,726 | 1/1974 | Krapp | 318/653 |

Primary Examiner—Robert J. Corcoran
Attorney, Agent, or Firm—Flynn & Frishauf

[57] ABSTRACT

The measuring apparatus comprises an electromagnetic induction type non-contacting distance measuring device including a detection coil disposed near the edge of a running metal strip, a filter for deriving out the high frequency component and the low frequency component of the output of the detection coil, means responsive to the high frequency component for determining the contour of the wavy edge of the strip and means responsive to the low frequency component for adjusting the lateral position of the detection coil with respect to the edge of the metal strip.

10 Claims, 6 Drawing Figures

METHOD AND APPARATUS FOR MEASURING THE SHAPE OF THE WAVY EDGES OF METAL STRIPS USING A DETECTION COIL CONTROLLED TO TRACK THE STRIP EDGE

This invention relates to a method of and apparatus for measuring the contour of a metal strip or web, for example a steel strip, and more particularly to a method and apparatus wherein the relative position of the detection coil of an electromagnetic type distance measuring device is automatically adjusted in the direction of the width of the strip to the positions near the side edges of the strip.

In order to measure the contour of the wavy edges of a metal strip it is necessary to measure the contour of a portion of the strip laterally spaced a predetermined distance from the side edge. To this end, it is necessary to control the position of the measuring device relative to the side edge of the strip by measuring the displacement of the measuring device from the side edge of the strip.

For this reason, according to a prior art method, the sensor of a contour measuring device is set at a predetermined position laterally spaced a predetermined distance from the side edge of the strip and the position of the sensor is adjusted manually or by a remote control system when the width of the strip is changed. According to another method, an optical detector is used for detecting the edge position and the ouput signal from the detector is used to control the position of the sensor.

With such methods, however, especially of the manual control type, where the contour of the strip is wavy it is impossible to correctly control the position of the sensor and in addition it is necessary to manually adjust the position of the sensor whenever the width of the strip is changed. To automatically control the position of the sensor by using an edge position detector, it is ncessary to use an independent edge position detector thus complicating the apparatus. Moreover, satisfactory edge position detector is not yet available and it has been impossible to use an optical edge position detector in an environment such as prevailing in a cold rolling mill where the atmosphere contains water droplets and water vapour.

Accordingly, it is an object of this invention to provide an improved method and apparatus capable of accurately determining the contour of the wavy edge of a metal strip irrspective of the zigzag movement of the metal strip and changing of the width thereof.

Another object of this invention is to provide an improved method and apparatus for accurately measuring the contour of the wavy edge of a metal strip capable of measuring the contour always at a definite position with respect to the edge of the strip.

A further object of this invention is to provide an improved method and apparatus capable of accurately determining the contour of the wavy edge of the strip in an adverse atmospheric condition containing droplets of water and water vapour as in the cold rolling mill.

A still further object of this invention is to provide improved apparatus for determining the contour of the wavy edge of a metal strip including simple means which not only measures the contour of the wavy edge but also maintains the detection coil of the distance measuring device always at a definite position with respect to the edge of the strip.

SUMMARY OF THE INVENTION

According to this invention there is provided a method of measuring the contour of a metal strip wherein the detection coil of an electromagnetic type non-contacting distance measuring device is disposed near the edge of a running metal strip for measuring the distance between the detection coil and the surface of the metal strip, wherein the method comprises the steps of separately deriving out a high frequency component and a low frequency component from the output of the detection coil, maintaining the lateral distance between the detection coil and the strip edge at a definite value by using the low frequency component, and measuring the contour of the wavy edge of the metal strip by using the high frequency component while the lateral distance is maintained at the definite value.

According to another aspect of this invention there is provided apparatus for measuring the contour of a metal strip wherein the detection coil of an electromagnetic type noncontacting distance measuring device is disposed near the edge of a running metal strip for measuring the distance between the surface of the strip and the detection coil, characterized in that the apparatus comprises filter means for separating out the high frequency component and the low frequency component of the output signal of the detection coil, position control means responsive to the low frequency component for maintaining the detection coil at a predetermined lateral position with respect to the edge of the strip, and means responsive to the high frequency component for measuring the distance between the surface of the metal strip and the detection coil, thereby determining the contour of the strip.

Further objects and advantages of the invention will be more fully understood from the following detailed description taken in conjunction with the accompanying drawings.

DETAILED DESCRIPTION

Figure 1:
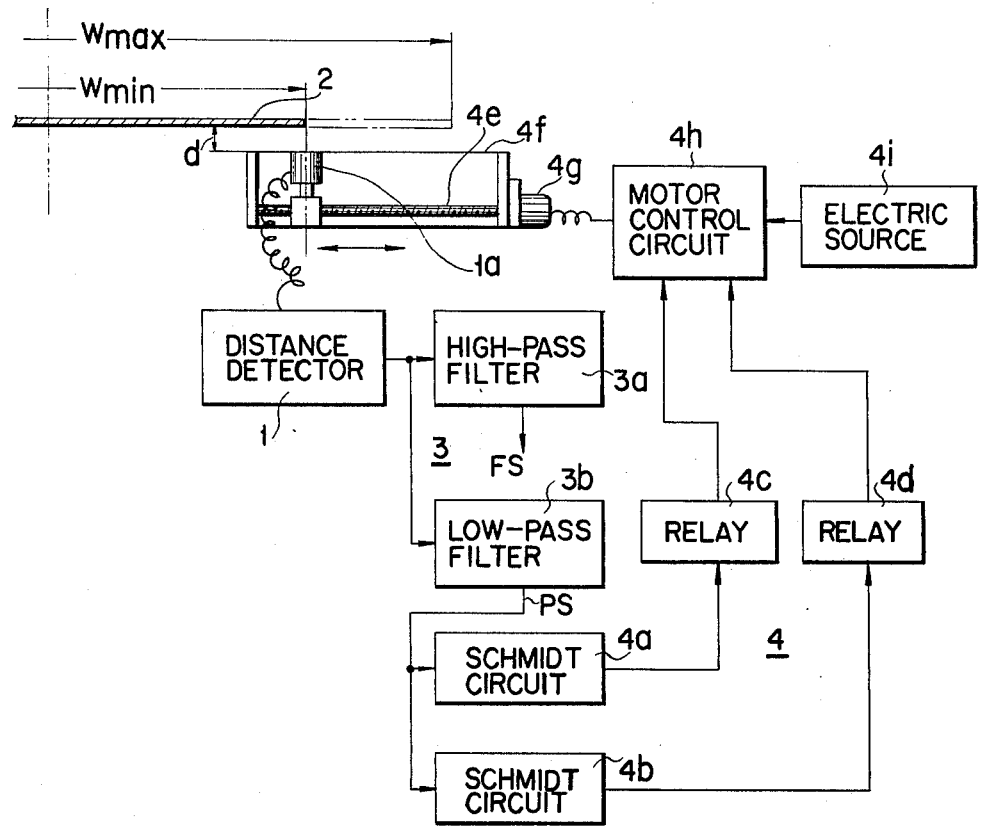
FIG. 1 is a block diagram showing the electrical connection of a preferred embodiment of this invention.
Figure 2:
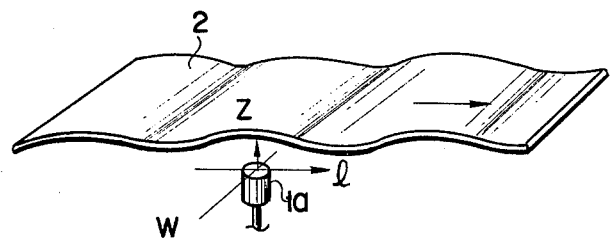
FIG. 2 is a perspective view showing the relative position of the strip and the detection coil utilized in the embodiment shown in FIG. 1.

With reference now to FIG. 1, the detection coil 1a of a distance detector or measuring device 1 which measures the distance from the edge of a strip 2 by a electromagnetic induction without contacting the strip is disposed near one edge thereof and the output signal from the distance detector 1 is applied to a frequency separator 3 comprising a high-pass filter 3a and a low-pass filter 3b. The output from the high-pass filter is utilized as a wavy contour measuring signal FS, whereas the output from the low-pass filter 3b is utilized as a measuring position signal PS which is applied to a position control device 4 for adjusting the position of the detection coil 1a in the direction of width of the strip 2.

The position control device 4 comprises a first Schmidt circuit 4a which operates when the level of the input signal PS from the low-pass filter exceeds a reference level $V_0$ and a second Schmidt circuit 4b which operates when the level of the input signal is lower than the reference level $V_0$. The ouputs from the first and seond Schmidt circuits 4a and 4b are applied to the first and second relays 4c and 4d, respectively. A position control mechanism 4f is provided for moving the detection coil 1a in the direction of width of the strip 2 by the rotation of a feed screw 4e driven by an electric motor 4g. The motor 4g is energized by a source 4i through a motor control circuit 4h which is connected to receive the outputs from the first and second relays 4c and 4d. When the output from the first relay 4c is applied the motor 4g is rotated to move the detection coil 1a toward the inside portion (to the left as viewed in FIG. 1) of the strip whereas when the output from the second relay 4d is applied the motor is rotated to move the detection coil outwardly or to the right as viewed in FIG. 1.

Figure 3:
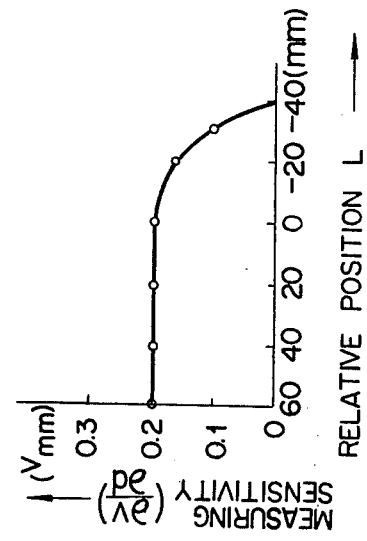
FIG. 3 is a block diagram showing the distance measuring device utilized in the embodiment shown in FIG. 1.

As shown in FIG. 3, a capacitor 12 is connected in parallel with the detection coil 1a the distance detector 1 to constitute a parallel resonance circuit 13 which is connected through a resistor 14 to a reference signal oscillator 15 which produces an output having a frequency equal to the inherent oscillation frequency of the resonance circuit 13 which is determined by the self-inductance of the detection coil 1a and the capacitance of the capacitor 12. Further, the resonance circuit 13 is connected to a Q-up amplifier circuit 18 comprising a positive phase amplifier 16 and a positive feedback resistor 17. The output from the positive phase amplifier 16 is applied to the inputs of the high-pass and low-pass filters 3a and 3b of the frequency separating circuit 3 to act as the measuring output signal MS. A suitable form of the distance detector 1 is disclosed in a copending application Ser. No. 521,812 filed Nov. 17, 1974, by the same inventors.

Figure 4:
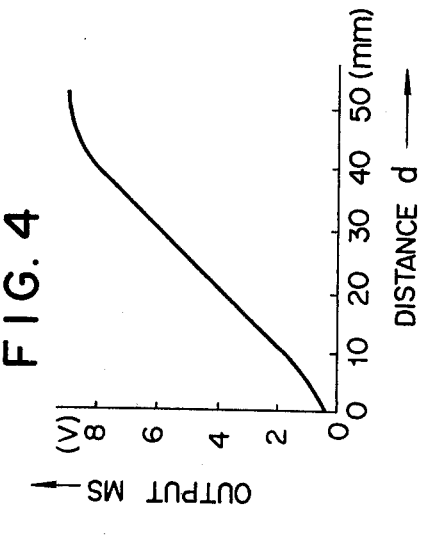
FIGS. 4, 5 and 6 are graphs showing the output characteristics of the distance measuring device shown in FIG. 3.
Figure 6:
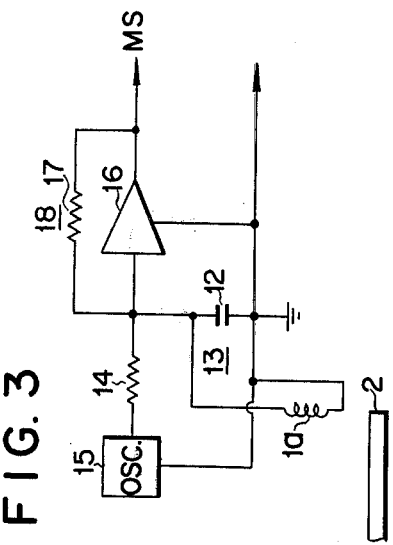
Figure 5:
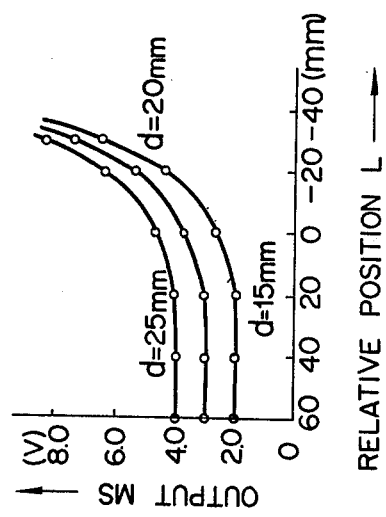

With the circuit construction described above, the impedance of the detection coil 1a of the distance detector 1 varies nonlinearly when the distance between the detection coil 1a and the surface of the running strip 2 varies, and such impedance variation of the detection coil results in a large variation in the oscillation current and voltage due to the non-linear frequency characteristic of the resonance circuit 13. Since the non-linearity of the frequency characteristic of the resonance circuit 13 is just opposite to the non-linearity of the impedance variation of the detection coil it is possible to make to be complementary the non-linear frequency characteristic of the resonance circuit 13 and the non-linear characteristic of the impedance variation of the detection coil by suitably adjusting the selectivity Q of the resonance circuit 13 by adjusting the amplification factor of the positive amplifier 16 of the Q-up circuit 18 and the amount of positive feedback through positive feedback resistor 17. Then, as shown in FIG. 4, it is possible to obtain a substantially linear measuring output signal MS when the distance between the detection coil 1a and the surface of the stip 2 varies. More particularly, such measuring output signal MS produced by the distance detector 1 varies substantially linearly as shown in FIG. 4 when the distance $d$ between the detection coil 1a and the surface of the strip varies, said distance being measured in the direction of the thickness Z of the strip perpendicularly to the direction of movement l of the strip. It is assumed herein that the position of the detection coil when its center line coincides with the edge of the strip is denoted by 0, the position of the detection coil on the inside of the edge is denoted by positive and that the position of the detection coil when it is on the outside of the edge of the strip is denoted by negative. Then output MS varies when the distance between the center line of the detection coil and the edge of th strip or relative position L of the detection coil and the edge of the strip varies as shown in FIG. 5, wherein the distance $d$ between the detection coil and the surface of the strip is taken as the parameter. The relationship between the relative position L and the distance $d$, or the measuring sensitivity $\delta V/\delta d$ is shown by FIG. 6.

Since the relative position L of the detection coil with reference to the edge of the strip varies when the strip moves along a zig-zag line or when the width of the strip varies such variation occurs at a relatively long period. On the other hand, the distance $d$ between the detection coil and the surface of the strip varies when the contour of the edge becomes wavy, so that the latter variation has relatively short period.

Accordingly, the high frequency component of the output signal MS from the distance detector 1 contains a varying component corresponding to the variation in the distance $d$ between the coil 1a and the surface of the strip 2 whereas the low frequency component of the output signal MS contains a varying component corresponding to the variation in the relative position L.

The output signal MS is separated into the high frequency component and the low frequency component by the high-pass filter 3a and th low-pass filter 3b so that the high frequency component is derived out as the edge wave measuring signal FS from the high-pass filter 3a and the low frequency component is derived out as the position signal PS from the low-pass filter 3b.

Accordingly, the edge wave measuring signal FS produced by the high-pass filter 3a varies as the distance $d$ varies, or the edge becomes wavy, so that it is possible to determine the contour of the wavy edge by measuring the variation in the edge wave measuring signal FS by suitable measuring means 10 (not shown). It is also possible to control the rolling mill by the edge wave measuring signal FS so as to eliminate the edge wave.

The position signal PS produced by the low-pass filter 3b varies as the relative position varies or when the position of the strip edge varies.

When the level of the position signal PS exceeds a reference level $V_0$ the first Schmidt circuit 4a operates, whereas when the signal PS decreases below the reference level $V_0$ the second Schmidt circuit 4b operates.

Accordingly, when the reference level $V_0$ is set to be equal to the value of the position signal when the center line of the detection coil 1a aligns with the strip edge, as the position of the strip edge varies due to the zig-zag movement of the strip or the variation in the width thereof so that when the center line of detection coil is on the outside of the strip edge the first Schmidt circuit 4a operates. On the other hand, when the center line of the detection coil moves inwardly or to the left, the second Schmidt circuit 4b operates.

When the first Schmidt circuit 4a operates as above described the first relay 4c operates to operate the motor control circuit 4h such that the motor 4g is rotated in a direction to move the detection coil 1a inwardly or to the left until the detection coil assumes the 0 position. When the second Schmidt circuit 4b operates the second relay 4d is operated to rotate the motor 4g in the opposite direction until the detection coil assumes the 0 position.

In this manner, the position of the detection coil is varied to follow the position of the strip edge in the direction of the width thereof. Accordingly, by designing the position control mechanism 4f such that the position of the detection coil is varied over a range wider than the maximum range of the variation of the position of the strip edge it would be possible to position the center line of the detection coil always in alignment with the strip edge.

Accordingly it is possible to accurately measure the wavy contour of the strip edge irrespective of the variation in the position of the strip edge caused by the zig-zag movement of the strip or change in the width thereof. Moreover, it is possible to measure the wavy contour of the strip edge and the relative position of the detection coil and the strip edge by a single distance detector 1. This arrangement permits accurate measurement in an adverse optical environment prevailing about a cold rolling mill, for example, where the surrounding atmosphere contains water droplets and water vapour and without using a bulky and expensive wavy contour measuring device because an electromagnetic type detection coil is used.

It will be clear that the output PS can also be used to control strip guides to correct the zig-zag movement of the strip. It is also clear that the invention is not limited to the particular embodiment described above. For example, other type of distance detector may be used so long as it is of the electromagnetic induction type as disclosed in said copending application which can measure the distance from the surface of the strip without contacting the same. A temperature sensitive resistance element having a negative temperature coefficient and a capacitor which are selected to have a complementary impedance-temperature coefficient may be combined with the detection coil to form a parallel resonance circuit. Such measuring apparatus is suitable for use in hot strip rolling mills. Further, the constructions of the frequency separating circuit and the position controller are not limited to those of the illustrated embodiment. Also, the strip is not limited to steel strips, but any conductive metal strip or web can be measured.

Furthermore, in the foregoing embodiment, although the variation in the measuring output caused by the variation in the distance between the detection coil and the strip edge was compensated for by moving the detection coil in the direction of the strip width, such compensation may be made by other method. For example, it is possible to electrically compensate the high frequency component signal by the low frequency component signal.

As has been described hereinabove, according to this invention, in a method and apparatus for measuring the wavy contour of the edge of a metal strip wherein an electromagnetic induction type non-contacting distance measuring device is used for measuring the distance between the surface of the metal strip and the distance measuring device, the variation in the distance between the distance measuring device and the strip edge is also detected as a position signal for compensating for the variation in the lateral position of the strip edge it is possible to correctly measure the contour of the wavy edge of the strip regardless of the zig-zag movement of the strip and changing of the strip width. Moreover, as the contour of the wavy edge and the position of the strip edge are measured by a single distance measuring device it is possible to simplify the construction. Further as an electromagnetic induction type distance measuring device is used, it is possible to measure precisely even in an adverse environment as described hereinabove.

What we claim is:

1. In a method of measuring the contour of the wavy edge of a metal strip wherein a single detection coil means of an electromagnetic type non-contacting distance measuring device is disposed near the edge of a running metal strip, offset therefrom in the direction of the strip thickness with the center line of the coil positioned a predetermined lateral distance from the edge of said strip, for measuring the distance in the direction of the strip thickness between said single detection coil means and the surface of said metal strip near said edge, the improvement which comprises the steps of separately deriving out a high frequency component and a low frequency component from the output of said single detection coil means, maintaining the lateral distance between the center line of said single detection coil means and the strip edge at said predetermined value by using said low frequency component to control the lateral position of said coil relative to said strip edge, and measuring the contour of the wavy edge of the metal strip by using said high frequency component, which high frequency component varies as a function of the distance of said coil from said surface in the direction of the strip thickness, while said lateral distance is maintained at said predetermined value.

2. A method according to claim 1 wherein said predetermined lateral distance is maintained zero.

3. A method according to claim 1 wherein said single detection coil means is moved in the lateral direction of said strip by said low frequency component so as to maintain said predetermined value regardless of a zig-zag movement of said strip and a change in the width of said strip.

4. In apparatus for measuring the contour of the wavy edge of a metal strip wherein a single detection coil means of an electromagnetic type non-contacting distance measuring device is disposed near the edge of a running metal strips offset therefrom in the direction of the strip thickness, with the center line of the coil positioned a predetermined lateral distance from the edge of said strip, for measuring the distance in the direction of the strip thickness between the surface of the strip near said edge and said single detection coil means, the improvement which comprises filter means for separating out the high frequency component and the low frequency component of the output signal of said single detection coil means, position control means responsive to said low frequency component for maintaining the center line of said single detection coil means at said predetermined lateral position with respect to the edge of said strip, and means responsive to said high frequency component for measuring the distance in the direction of the strip thickness between the surface of said metal strip and said detection coil, thereby determining the contour of the wavy edge of the strip.

5. An apparatus according to claim 4 wherein said position control means comprises a first Schmidt circuit which produces an output when the level of said low frequency component exceeds a predetermined reference level, a second Schmidt circuit which produces an output when the level of said low frequency component decreases below said predetermined reference level, an electric motor, motor control means for controlling the rotation and the direction of rotation of said motor responsive to the outputs from said first and second Schmidt circuits, and means including a feed screw driven by said motor for moving said single detection coil means in the direction of the width of said metal strip responsive to rotation of said motor.

6. An apparatus according to claim 4 wherein said electromagnetic type non-contacting distance measuring device comprises a capacitor connected in parallel to said single detection coil means for forming a parallel resonance circuit, a reference signal oscillator connected to said parallel resonance circuit for producing an output signal having a frequency equal to the resonance frequency of said parallel resonance oscillator, a positive phase amplifier connected to receive the output signal from said reference signal oscillator and a positive feedback resistor connected across said positive phase amplifier.

7. An apparatus according to claim 5 wherein said motor control means includes means for causing said motor to rotate in a first direction responsive to an output of said first Schmidt circuit, and for causing said motor to rotate in the opposite direction responsive to an output from said second Schmidt circuit.

8. An apparatus according to claim 4 wherein said position control means maintains said lateral predetermined distance at a value of substantially zero.

9. An apparatus according to claim 4 wherein said position control means comprises first means for producing an output when the level of said low frequency component exceeds a predetermined reference level, second means for producing an output when the level of said low frequency component decreases below said predetermined reference level, an electric motor, motor control means for controlling the rotation and the direction of rotation of said motor responsive to the outputs from said first and second means, and means coupled to said motor and to said single detection coil means for moving said single detection coil means in the direction of width of said metal strip responsive to rotation of said motor.

10. An apparatus according to claim 9 wherein said moving means comprises a feed screw driven by said motor and coupled to said detection coil means.

* * * * *